US006970409B2

(12) United States Patent
Araki et al.

(10) Patent No.: US 6,970,409 B2
(45) Date of Patent: Nov. 29, 2005

(54) INFORMATION RECORDING APPARATUS

(75) Inventors: Yoshitsugu Araki, Tsurugashima (JP); Takanori Maeda, Tsurugashima (JP)

(73) Assignee: Pioneer Corporation, Tokyo-to (JP)

( * ) Notice: Subject to any disclaimer, the term of this patent is extended or adjusted under 35 U.S.C. 154(b) by 604 days.

(21) Appl. No.: 10/068,024

(22) Filed: Feb. 8, 2002

(65) Prior Publication Data

US 2002/0110068 A1 Aug. 15, 2002

(30) Foreign Application Priority Data

Feb. 9, 2001 (JP) .......................... P2001-033963

(51) Int. Cl.[7] ................................................ G11B 7/00
(52) U.S. Cl. ................................................ 369/53.24
(58) Field of Search .............................. 369/275.3, 94, 369/53.2, 53.24, 53.36, 53.44

(56) References Cited

U.S. PATENT DOCUMENTS 5,414,451 A 5/1995 Sugiyama et al. .......... 347/258

FOREIGN PATENT DOCUMENTS

| | | |
|---|---|---|
| EP | 0 957 477 A | 11/1999 |
| JP | 2000-285469 | 10/2000 |
| JP | 2000-293947 | 10/2000 |
| JP | 2001-023170 | 1/2001 |
| WO | WO 00/28532 | 5/2000 |

*Primary Examiner*—Nabil Hindi
(74) *Attorney, Agent, or Firm*—Morgan Lewis & Bockius LLP

(57) ABSTRACT

An information recording apparatus capable of detecting an accurate tracking error even if a reflectance or a transmittance of respective information recording layers varies when information is recorded onto a multilayer optical information recording medium having a plurality of information recording layers, wherein the apparatus comprises a detecting device for detecting a position of a boundary portion between a recorded area where the information has already been recorded and an unrecorded area in the information recording layer; an inhibiting device for inhibiting recording the information onto an area in one information recording layer in a case where the boundary portion in an information recording layer may affect a tracking servo for recording the information onto said one information recording layer.

7 Claims, 6 Drawing Sheets

INFORMATION RECORDING APPARATUS

BACKGROUND OF THE INVENTION

1. Field of the Invention

The present invention relates to a multilayer optical information recording medium having a plurality of information recording layers where information is recorded and an information recording apparatus for recording information onto the multilayer optical information recording medium.

2. Related Background Art

In recent years, mass-storage optical disks, typically CD or DVD, have come into wide use. Additionally, to further improve recording densities of optical disks according to demand for recording long-time video data or the like, a multilayer optical disk having two or more information recording layers is under development. In addition, if each information recording layer is formed by a phase change recording layer, it becomes possible to realize a multilayer optical disk capable of recording information in addition to reproducing information.

The phase change recording layer of the multilayer optical disk, however, is put in a crystalline state initially before recording, while it is put in an amorphous state after the recording. In general, an unrecorded area having the phase change recording layer in the crystalline state differs from a recorded area having the phase change recording layer in the amorphous state in a reflectance and a transmittance. Assuming such a condition that an information recording layer, which is an object of recording, is irradiated with a laser beam in recording onto a recordable two-layer optical disk and that its reflected light is received, the recording on the information recording layer near the laser source is affected by a reflectance of an underlying information recording layer. Furthermore, during recording onto an information recording layer far from the laser beam emitting side, the recording is affected by a reflectance or a transmittance of an overlying information recording layer. Unless a uniform distribution is observed in the transmittance or the reflectance of each information recording layer, an intensity distribution may be uniformless in the optical beam of an optical detector.

Particularly, in performing a tracking servo in an information recording apparatus for recording onto the multilayer optical disk, a variation of the transmittance or the reflectance remarkably affects the tracking servo. In other words, if the recorded area is mixed with the unrecorded area in the information recording layer, components caused by the variation of the transmittance or the reflectance are superposed on the light intensity distribution in the optical detector. Additionally, if a laser beam is transmitted or reflected in the vicinity of a boundary portion between the recorded area and the unrecorded area, it may cause an offset in a tracking error in the information recording layer which is an object of recording. The offset occurs in the tracking error since the effect of the boundary portion causes laser power to be asymmetric between one side and the other side in the disk radial direction even if a track is traced accurately in detecting a tracking error in the push-pull method generally used for the information recording apparatus. As set forth hereinabove, there has been such a problem that a performance of the tracking servo is unsuccessfully secured due to the offset of the tracking error caused by a recording condition of each information recording layer when information is recorded onto a recordable multilayer optical disk.

SUMMARY OF THE INVENTION

Therefore, the present invention is provided in view of these problems and it is an object of the present invention to provide an information recording apparatus capable of detecting an accurate tracking error without affecting a tracking servo in other information recording layers even if a reflectance or a transmittance of each information recording layer varies according to a presence or absence of a recorded area when information is recorded onto a multilayer optical information recording medium.

In one aspect of the present invention, there is provided an information recording apparatus for optically recording information onto an information recording medium having a plurality of information layers. The apparatus is provided with: a detecting device for detecting a position of a boundary portion between a recorded area where the information has already been recorded and an unrecorded area in the information recording layer; an inhibiting device for inhibiting recording the information onto an area in one information recording layer in a case where the boundary portion in an information recording layer may affect a tracking servo for recording the information onto said one information recording layer.

According to this aspect, a detecting device detects a position of a boundary portion between a recorded area where the information has already been recorded and an unrecorded area in the information recording layer. Then an inhibiting device for inhibiting recording the information onto an area in one information recording layer in a case where the boundary portion in an information recording layer may affect a tracking servo for recording the information onto said one information recording layer. Therefore, with a control to inhibit recording onto areas corresponding to the vicinity of the boundary portion (for example, given areas where respective information recording surfaces overlap in a normal direction), it is possible to prevent an occurrence of an offset in a tracking error so as to realize an accurate tracking servo in recording onto the multilayer optical information recording medium.

In another aspect of the present invention, the inhibiting device includes a determining device for determining a degree of the effect of the boundary portion on the tracking servo on the basis of the number of recorded or unrecorded tracks of the other information recording layers within a range of a diameter of a luminous flux in the boundary portion irradiated with a light beam for recording.

According to this aspect, the number of recorded or unrecorded tracks is identified within a range of a diameter of a luminous flux in the boundary portion irradiated with the light beam when information is recorded onto the multilayer optical information recording medium, thereby enabling a rough area comparison between the recorded areas and the unrecorded areas and facilitating a determination of whether there is an effect on the tracking servo.

In further aspect of the present invention, an information recording apparatus for optically recording information onto an information recording medium having a plurality of information layers with a light beam for recording is provided with: a recording device for recording the information onto the target information recording; a tracking error detecting device for detecting a tracking error on the basis of the light beam receiving signal; a controlling device for controlling a recording order for the respective information recording layers so as to start recording onto another information recording layer when recording onto the whole area of the target information recording layer is completed.

According to this aspect, a recording device record the information onto the target information recording. While a tracking error detecting device detects a tracking error on the basis of the light beam receiving signal. Then a controlling device controls a recording order for the respective information recording layers so as to start recording onto another information recording layer when recording onto the whole area of the target information recording layer is completed. Therefore, during recording onto the target information recording layer, each of other information recording layers is entirely covered by either of a recorded area and an unrecorded area, thereby inhibiting a mixture of the recorded areas and the unrecorded areas, preventing the boundary portion from affecting the tracking servo, and realizing the accurate tracking servo when information is recorded onto the multilayer optical information recording medium.

In further aspect of the present invention, the controlling device controls the recording order so as to record information onto an adjacent information recording layer one by one toward a light beam emitting source from the information recording layer farthest from the light beam emitting source.

According to this aspect, the controlling device controls the recording order so as to record information onto an adjacent information recording layer one by one toward a light beam emitting source from the information recording layer from the light beam emitting source. Therefore, a farther layer is always a recorded area and a near layer is always an unrecorded area for the information recording layer to be an object of recording, thereby stabilizing a detection of a tracking error with keeping a stable irradiation condition with the recording light.

In further aspect of the present invention, the controlling device controls the recording order so as to record information onto an adjacent information recording layer one by one farther from a light beam emitting source from the information recording layer nearest the light beam emitting source.

According to this aspect, the controlling device controls the recording order so as to record information onto an adjacent information recording layer one by one farther from a light beam emitting source from the information recording layer nearest the light beam emitting source. Therefore, a near layer is always a recorded area and a further layer is always an unrecorded area for the information recording layer to be an object of recording, thereby stabilizing a detection of a tracking error with keeping a stable irradiation condition with the recording light.

DETAILED DESCRIPTION OF THE PREFERRED EMBODIMENTS

The preferred embodiments of the present invention will now be described in detail hereinafter with reference to the accompanying drawings.

Figure 1:
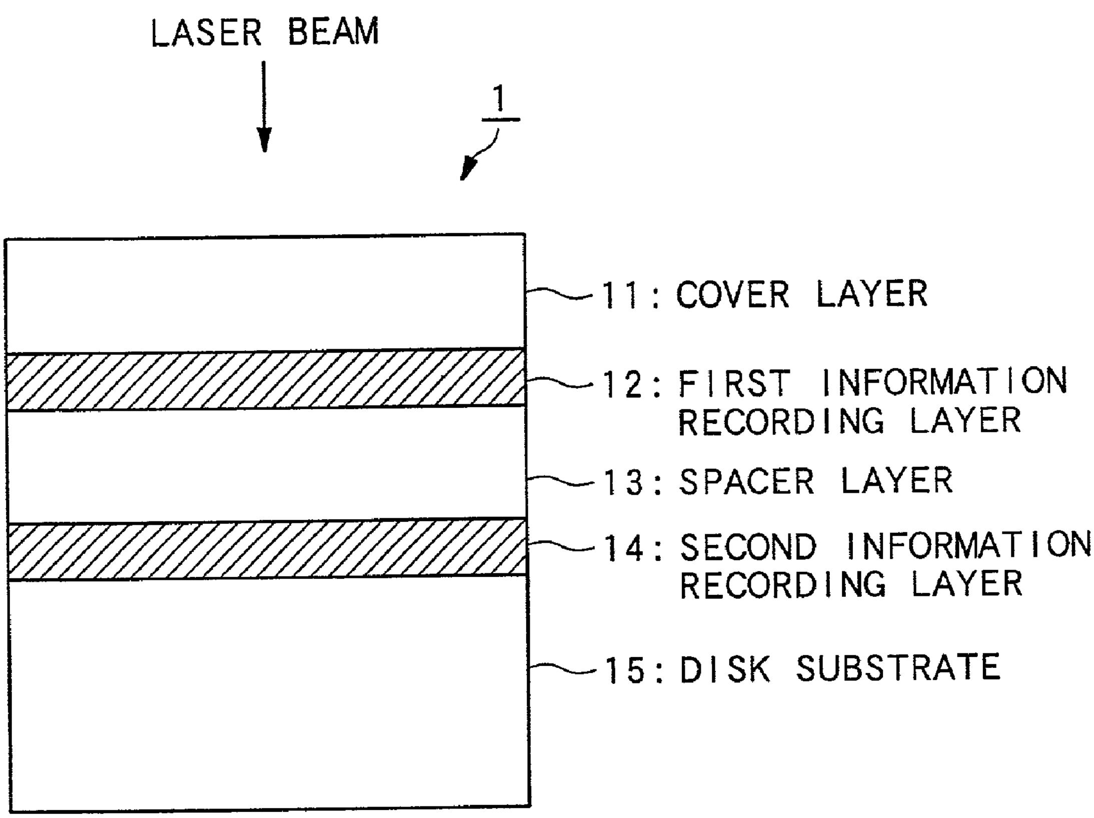
FIG. 1 is a diagram showing a sectional structure of a two-layer optical disk which is a typical multilayer optical information recording medium in the preferred embodiments.

Referring to FIG. 1, there is shown a diagram of a sectional structure of a two-layer optical disk 1 which is an example of a multilayer optical information recording medium according to this embodiment. As shown in FIG. 1, the two-layer optical disk 1 has a sectional structure formed by a cover layer 11, a first information recording layer 12, a spacer layer 13, a second information recording layer 14, and a disk substrate 15 sequentially. When an information recording and reproducing apparatus according to this embodiment described later records information on the two-layer optical disk 1, a laser beam is emitted from the upper side in FIG. 1.

In FIG. 1, the cover layer 11 is used for protecting the first information recording layer 12, having a given thickness. The first information recording layer 12, which has a phase change recording layer for recording information on the basis of a phase change, is a recording layer located relatively near the laser beam emitting source. The spacer layer 13 is a transparent layer arranged between the first information recording layer 12 and the second information recording layer 14. The second information recording layer 14, which has a phase change recording layer in the same manner as for the first information recording layer 12, is a recording layer located relatively far from the laser beam emitting source. The disk substrate 15 is a substrate having a given thickness, made of polycarbonate material or the like.

In the above two-layer optical disk 1, the phase change recording layers formed on the first information recording layer 12 and the second information recording layer 14 are crystalline in its initial state, while their characteristic changes to an amorphous state by being irradiated with a laser beam at recording and reproducing. In other words, a recorded area in which information is recorded is put in the amorphous state and an unrecorded area is put in the crystalline state. Generally, a reflectance for a laser beam depends upon the crystalline state or the amorphous state on the basis of characteristics of the phase change recording material. In other words, the reflectance varies according to the recorded area or the unrecorded area in the first information recording layer 12 or the second information recording layer 14.

For the two-layer optical disk 1 having the sectional structure in FIG. 1, recording onto the first information recording layer 12 is affected by a reflectance of the second information recording layer 14. In other words, when a laser beam is condensed on the first information recording layer 12 and its reflected light is detected by an optical detector, a reflected light from the second information recording layer 14 reaches the optical detector as a stray light component and therefore a detected level varies according to the reflectance. In addition, a reflectance and a transmittance of the first information recording layer 12 affect recording onto the second information recording layer 14. In other words, a laser beam passes through the first information recording layer 12 when it is condensed on the second information recording layer 14, and therefore a light intensity distribution of the irradiation varies according to its reflectance and a reflected light from the first information recording layer 12 have an effect with the same action as for the above.

Figure 2:
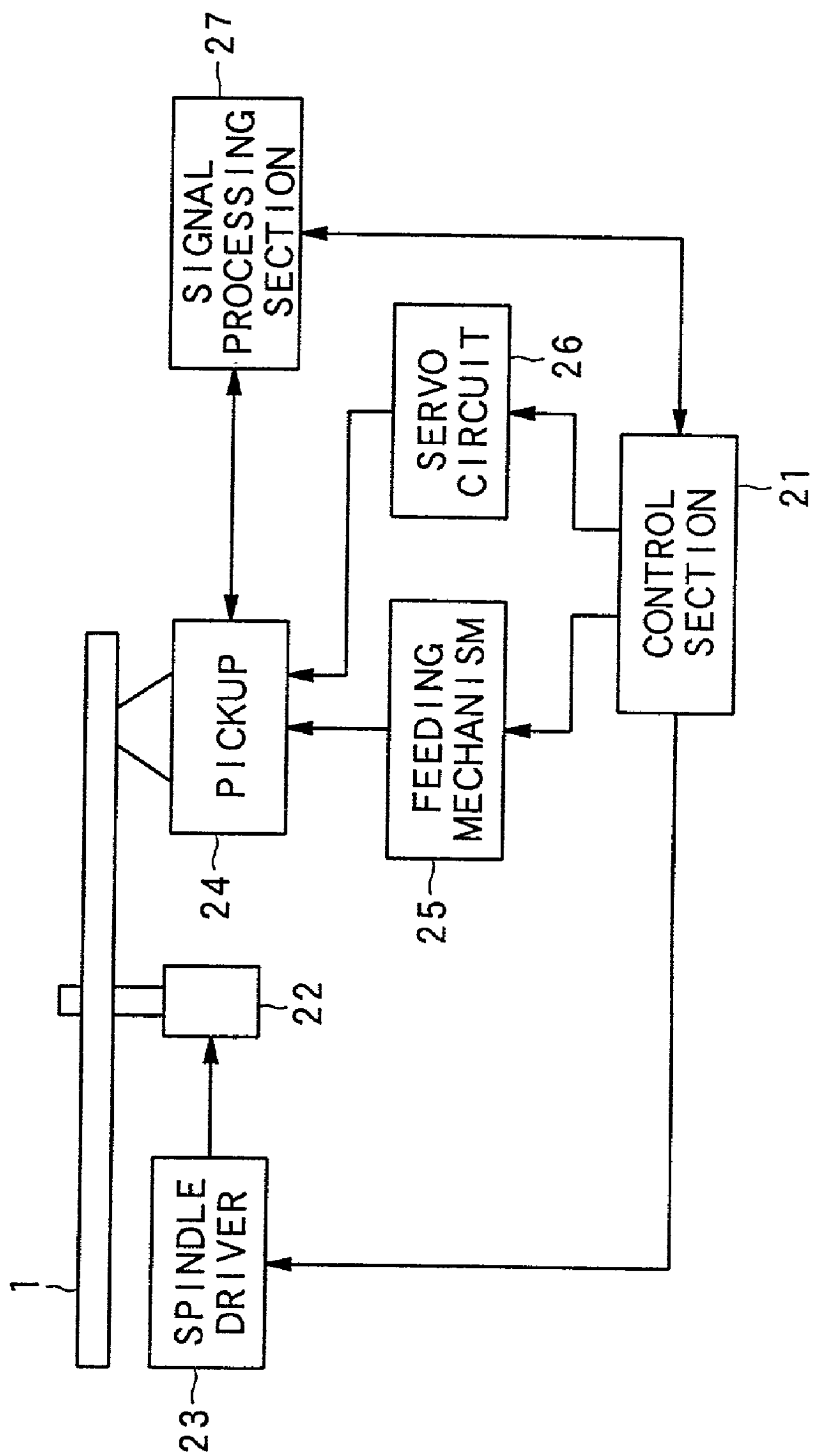
FIG. 2 is a block diagram showing a schematic configuration of an information recording apparatus according to the embodiments.

Next, referring to FIG. 2, there is shown a block diagram of a schematic configuration of the information recording and reproducing apparatus according to this embodiment. The information recording and reproducing apparatus shown in FIG. 2 comprises a control section 21, a spindle motor 22, a spindle driver 23, a pickup 24, a feeding mechanism 25, a servo circuit 26, and a signal processing section 27 and performs a recording operation of the mounted two-layer optical disk 1.

In the above arrangement, the control section 21 controls the recording operation of the information recording apparatus as a whole. The control section 21 is connected to respective components shown in FIG. 2 to control the operation by exchanging data or control signals. This control section 21 has a role of executing and controlling the record processing in this embodiment as described later.

The two-layer optical disk 1 mounted on the information recording and reproducing apparatus is irradiated with a laser beam by the pickup 24 while it is driven rotatively by the spindle motor 22. In this condition, the spindle driver 23 controls the rotation of the spindle motor 22 so that a regular linear velocity is maintained for the two-layer optical disk 1.

The feeding mechanism 25 controls a movement of the pickup 24 in a radial direction of the two-layer optical disk 1 by driving and controlling a feeding motor so as to move the pickup 24 to a track position corresponding to the above recorded area at recording and reproducing. The servo circuit 26 controls an actuator of the pickup 24 for a focusing servo and a tracking servo. The signal processing section 27 drives and controls a semiconductor laser of the pickup 24 on the basis of the recorded information and performs signal processing for generating various signals on the basis of a light receiving output of the pickup 24.

Subsequently, in this embodiment, the pickup 24 detects a tracking error in the push-pull method so as to enable the servo circuit 26 to perform a tracking servo. In this condition, the pickup 24 detects the tracking error on the basis of a differential output between a disk inner circumferential side and a disk outer circumferential side at tracing on tracks. If a recorded area is mixed with an unrecorded area on the two-layer optical disk 1 as set forth in the above, then there is a problem that an offset of the tracking error is caused by an effect of their boundary portion.

Figure 3A:
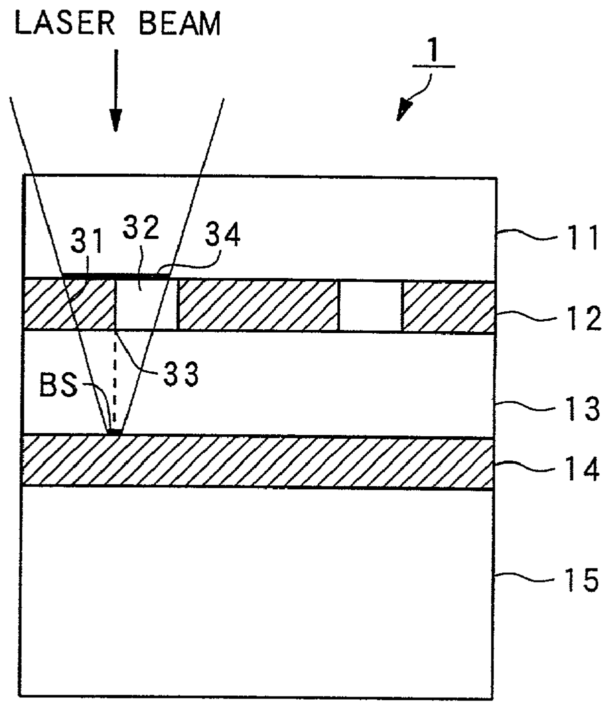
FIG. 3A is a cross section diagram of assistance in explaining a condition in which recording and reproducing to or from a second information recording layer of the two-layer optical disk is affected by a first information recording layer.

Referring to FIG. 3, there is shown a diagram of assistance in explaining a condition affected by the first information recording layer 12 at recording and reproducing to or from the second information recording layer 14 of the two-layer optical disk 1. FIG. 3A shows a condition of a cross section at recording and reproducing to or from the second information recording layer 14, in which a recorded area 31 where information has already been recorded is adjacent to an unrecorded area 32 maintaining an initial state in a boundary portion 33 in the first information recording layer 12. In other words, the cross section is put in the condition shown in FIG. 3A if a part of a track range remains in the initial state when information is written onto the first information recording layer 12 a plurality of times.

On the other hand, the laser beam emitted from the side of the cover layer 11 passes through the first information recording layer 12 and is condensed on the second information recording layer 14 to form a beam spot BS. In this condition, as shown in FIG. 3A, an irradiated area 34 of the first information recording layer 12 is irradiated in a defocus state with the laser beam and a reflection of its partial area affects a reflectance in the irradiated area 34. Then, there occurs a tracking error offset problem due to an action described later when the irradiated area 34 in the first information recording layer 12 overlaps the boundary portion 33 as shown in FIG. 3A.

Figure 3B:
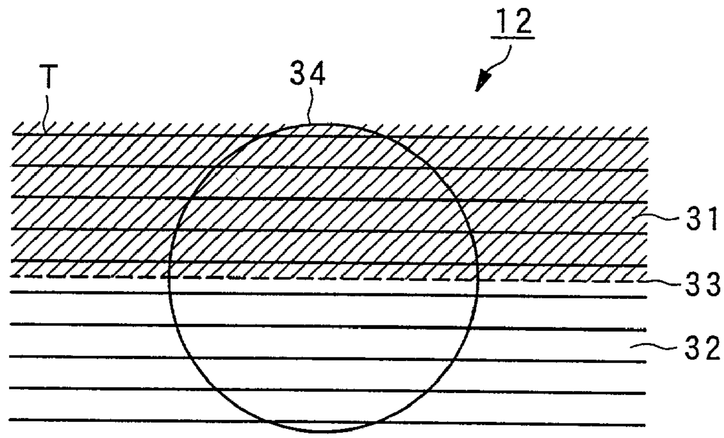
FIG. 3B is a plain diagram of assistance in explaining a condition in which recording and reproducing to or from a second information recording layer of the two-layer optical disk is affected by a first information recording layer.

Referring to FIG. 3B, there is shown a diagram of assistance in typically explaining a condition of the first information recording layer 12, which is a top view of FIG. 3A. As shown in FIG. 3B, the irradiated area 34 in the first information recording layer 12 is in the defocus state and therefore spreads in a relatively wide area including a plurality of tracks T (FIG. 3B shows an example in which the irradiated area 34 includes ten tracks T). Correspondently with FIG. 3A, a center of the irradiated area 34 almost matches the boundary portion 33 and the irradiated area includes almost the same area of the recorded area 31 as for the unrecorded area 32.

Generally, a reflectance of the phase change recording layer in the crystalline state is higher than that a reflectance in the amorphous state and therefore a reflectance of the unrecorded area 32 is lower than a reflectance of the recorded area 31. Accordingly, the reflected light from the irradiated area 34 is received by the pickup 24 in a state of an asymmetric light intensity distribution in the disk radial direction. As a result of a superposition of this light on the reflected light from the second information recording layer 14, an offset occurs in the tracking error as described later.

The luminous flux diameter D of the irradiated area 34 is generally given by the following expression:

$$D = NA/n \times d \times 2 \quad (1)$$

where NA is a numerical aperture, n is a refractive index of a substrate, and d is a distance between the first information recording layer 12 and the second information recording layer 14. For example, on condition that NA=0.85, n=1.5, and d=30 $\mu$m, the luminous flux diameter D equals 50 $\mu$m or so.

Figure 4:
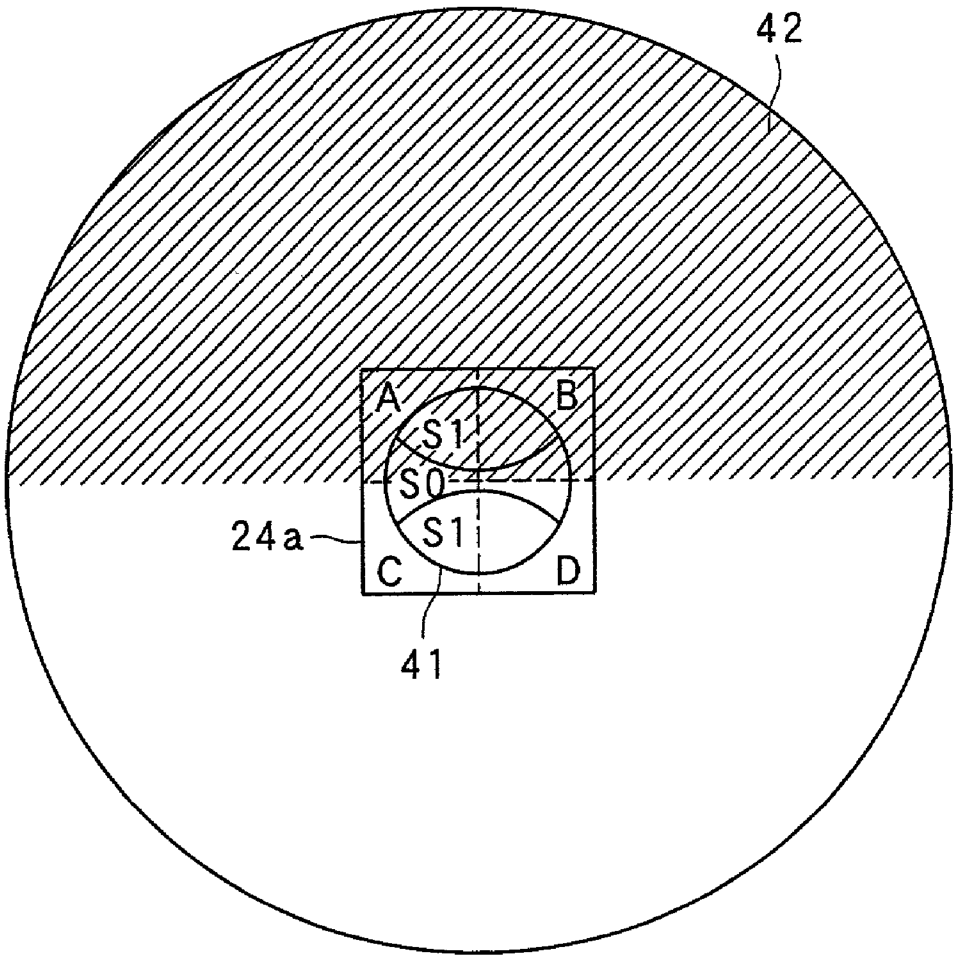
FIG. 4 is a diagram showing a light receiving pattern corresponding to the condition shown in FIG. 3 in a light receiving position of a pickup.

Next, referring to FIG. 4, there is shown a diagram of a light receiving pattern corresponding to the condition shown in FIG. 3 in a light receiving position of the pickup 24. By using FIG. 4, a description will be given below on a mechanism in which an offset occurs in a tracking error in the second information recording layer 14. The light receiving pattern shown in FIG. 4 includes a light receiving pattern 41 corresponding to a beam spot BS of the second information recording layer 14 and a light receiving pattern 42 corresponding to an irradiated area 34 of the first information recording layer 12 superposed on it. In addition, an optical detector 24*a* having a tetrameric configuration is arranged in the position of the light receiving pattern 41 corresponding to the beam spot BS.

The optical detector 24*a* is assumed to comprise segmented areas A, B, C, and D, with the areas A and B in one side and the areas C and D in the other side with respect to a disk radial direction. A tracking error in the push-pull method can be detected by obtaining a differential output (A+B)−(C+D) based on respective segmented areas. On the other hand, the light receiving pattern 41 corresponding to the beam spot BS is made of a primary diffracted light S1 corresponding to a track groove superposed on a zero-order diffracted light S0 which is the main component. When the beam spot BS traces the center of the track, the primary diffracted light S1 is distributed symmetrically with respect to the track, thereby causing no tracking error.

In FIG. 4, however, the light receiving pattern 42 in the irradiated area 34 affects a tracking error. In other words, the boundary portion 34 matches the position corresponding to the track to be traced, and therefore one side of the area in the disk radial direction overlaps the recorded area 31 and the other side of the area overlaps the unrecorded area 32, thereby causing a light receiving level to be asymmetric with respect to the disk radial direction. As a result, the differential output (A+B)–(C+D) with the optical detector 24*a* does not equal 0 even if the beam spot BS traces the center of the track, thereby causing an offset in the tracking error.

This holds true not only for the above two-layer optical disk 1, but for a multilayer optical disk where a plurality of information recording layers are formed in the same manner. In the latter case, an information recording layer to be an object of recording in the multilayer optical disk is affected by a reflectance of other information recording layers. Therefore, if there is a mixture of recorded areas and unrecorded areas in any of other information recording layers, the above problem may occur in a tracking servo in the push-pull method.

Furthermore, while the effect of the reflectance in the first information recording layer 12 has been described in the example shown in FIG. 3 and FIG. 4, an effect of a transmittance can be described in the same manner. If only the effect of the transmittance is considered, an optical beam which has passed through the first information recording layer 12 is applied to the beam spot BS of the second information recording layer 14 and therefore a light receiving level becomes asymmetric only in the light receiving pattern 41 in FIG. 4. In this condition, with an appropriate adjustment of an absorptance of a phase change recording material in the two-layer optical disk 1, a transmittance of the recorded area 31 can be equivalent to that of the unrecorded area 32. In this condition, there is no need for taking into consideration an effect of the transmittance, but only the effect of the reflectance should be considered.

While the effect of the first information recording layer 12 has been described in recording onto the second information recording layer 14 in the example shown in FIG. 3 and FIG. 4, an effect of the second information recording layer 14 can also be described in the same manner in recording onto the first information recording layer 12. In this condition, however, the optical beam which has passed through the underlying second information recording layer is not applied to the overlying first information recording layer 12 and therefore there is no need for taking onto consideration the transmittance of the second information recording layer 14, but only the effect of the reflectance should be considered.

In this embodiment, the above problem is resolved by using a procedure for record processing onto a multilayer optical disk. Hereinafter, a first embodiment and a second embodiment will be described by giving an example of the present invention applied to record processing onto a general multilayer optical disk including two or more layers.

Figure 5:
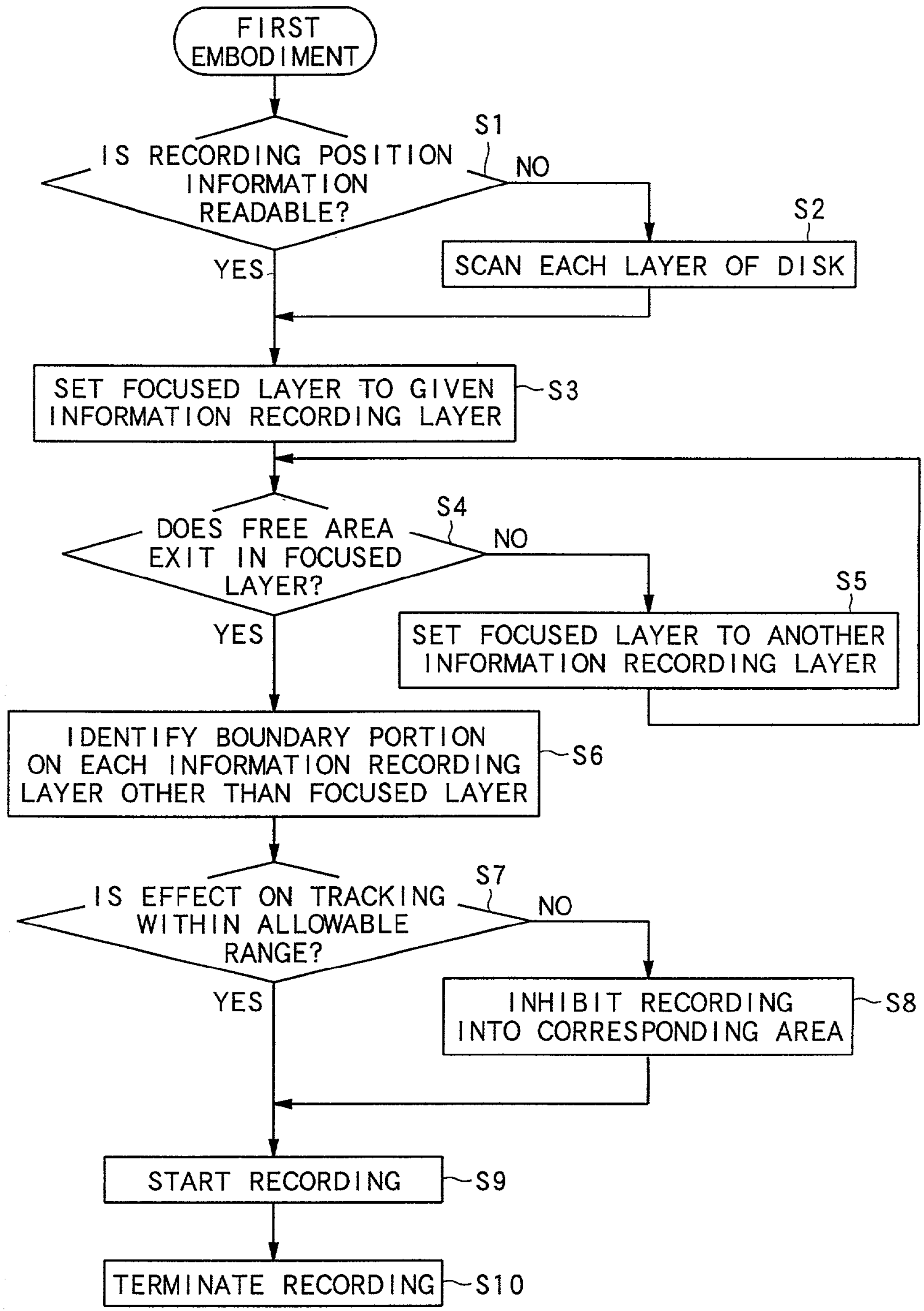
FIG. 5 is a flowchart of assistance in explaining a procedure for record processing corresponding to a first embodiment.

First, a first embodiment according to the present invention is described below. Referring to FIG. 5, there is shown a flowchart of assistance in explaining a procedure for record processing corresponding to the first embodiment. As shown in FIG. 5, after the record processing is started, it is determined whether recording position information of the multilayer optical disk is readable (step S1). This recording position information indicates a recording position in each information recording layer forming the multilayer optical disk. In other words, the positions of the recorded area 31, the unrecorded area 32, and the boundary portion 33 therebetween can be identified on the basis of this recording position information.

If the above recording position information is recorded in a given record area of the multilayer optical disk (step S1), it should be read for use. On the other hand, the recording position information cannot be read from the multilayer optical disk in some cases (step S1: NO). In other words, according to a multilayer optical disk type, there are assumed the following conditions; there is no record area for recording the recording position information or the recording position information cannot be recorded appropriately in the record area due to a defect during the recording operation. In these conditions, the respective information recording layers forming the multilayer optical disk are scanned to check the recorded condition (step S2). At this point, phase change recording layers of the information recording layers are scanned at high speed and the recorded condition is identified on the basis of the reflected light level or a significance of a tracking error, by which the recording position information can be determined.

Next, a focused layer (an information recording layer to be focused on as an object of recording) is set to a given information recording layer (step S3). In this condition, the information recording layer can be appropriately selected so as to meet a convenience of record processing. Then, it is determined whether a free area required for recording exists in the focused layer on the basis of the recording position information obtained in the steps S1 and S2 (step S4). As a result, if the free area in the focused layer is insufficient (step S4: NO), an information recording layer other than the information recording layer set in the step S3 is set as a focused layer (step S5) and the control progresses to the step S4. If it is determined that there is no free area in all the information recording layers, the processing in FIG. 5 is terminated.

Next, the boundary portion 33 of each information recording layer other than the focused layer is identified on the basis of the recording position information (step S6). In other words, it is to inhibit an area affected by the boundary portion 33 from being recorded in order to prevent the condition described in FIG. 2 and FIG. 3. Then, an effect of the boundary portion 33 identified in the step S6 on a tracking servo is determined to judge whether it is within an allowable range of a normal tracking servo (step S7).

In the step S7, various determination rules can be used and one of their example is described below. Concretely, the determination can be made on the basis of a ratio of the number of tracks included within the range of the luminous flux diameter D in the above expression (1) in the vicinity of the boundary portion 33 on a given overlying layer. For example, if the unrecorded area 32 is included in one side within the range of the luminous flux diameter D, the following expression is used for the determination with the number of unrecorded tracks m included there:

$$M/(D/TP) \leqq TH \tag{2}$$

where TH is a threshold and TP is a track pitch. If the unrecorded area 32 exists entirely and the recorded area 31 partially exists, the same calculation can be made by using the number of recorded tracks included there. In addition, the threshold TH can be appropriately set according to a size of the luminous flux diameter D or a difference of a reflectance or a transmittance between the recorded area 31 and the unrecorded area 32.

If the effect on the tracking servo is determined to be outside the allowable range in the step S7 (Step S7: NO), information is inhibited from being recorded onto the corresponding areas in the focused layer (step S8). In other words, it is possible to prevent recording onto the focused layer in the condition described by referring to FIG. 3 and FIG. 4.

Subsequently, information starts to be recorded in areas other than the inhibited areas in the focused layer (step S9). Then, the recording is terminated when the required information has been recorded (step S10). This termination of the recording is determined on the basis of the information in the record area predetermined in the optical disk 1. At this point, it is permitted to leave unrecorded areas 33 as remainders not affecting the tracking servo in other information recording layers.

As set forth hereinabove, according to the first embodiment, if irradiating areas in the vicinity of the boundary portion 33 with a laser beam affects a tracking servo, it is inhibited to record information onto the corresponding areas in a focused layer even if the focused information recording layer includes both of recorded areas 31 and unrecorded areas 32 in recording onto a multilayer optical disk. Therefore, a reflected light from a beam spot on the tracks of the information recording layer keeps symmetricity of power in the disk radial direction, thereby realizing an accurate tracking servo without causing a tracking offset.

Figure 6:
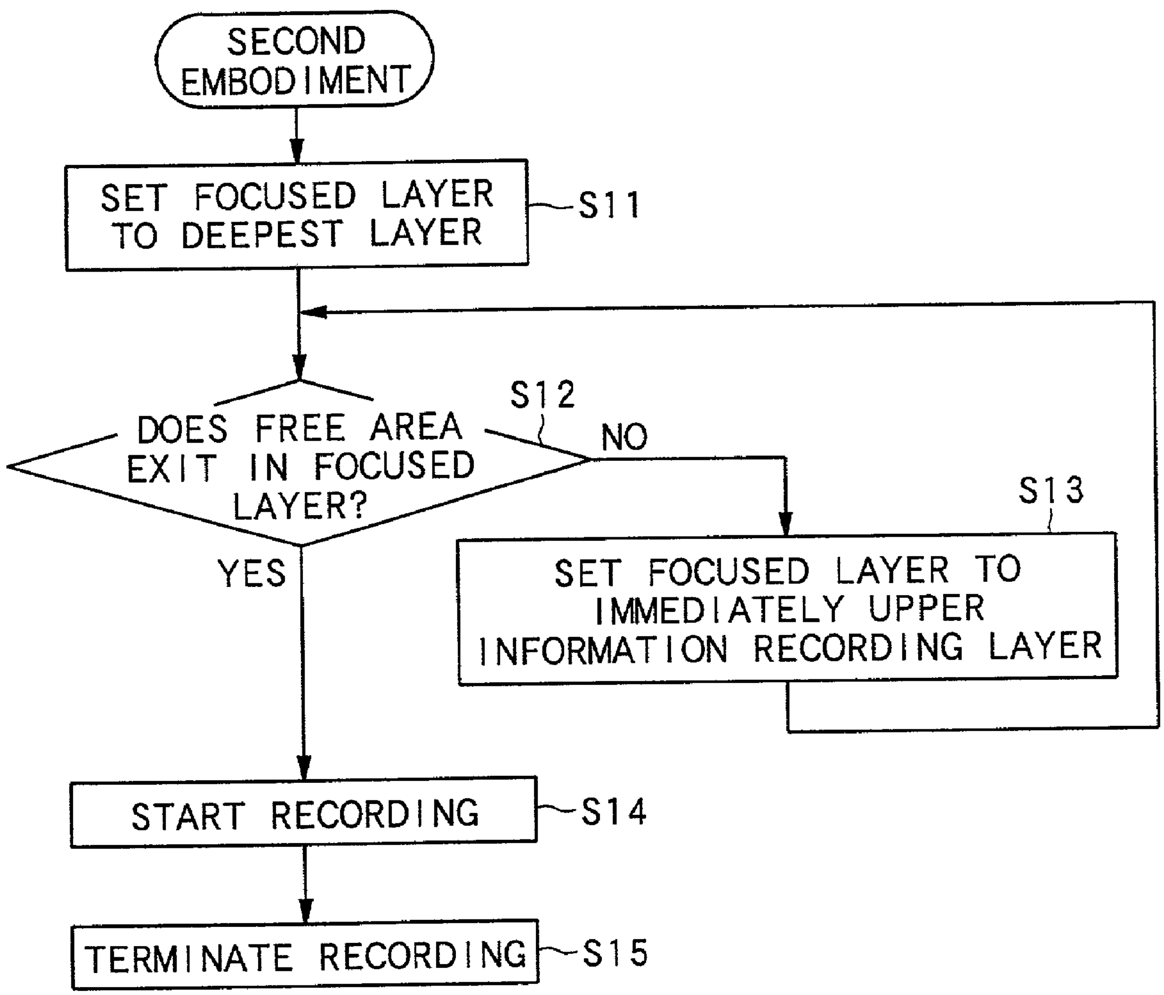
FIG. 6 is a flowchart of assistance in explaining a procedure for record processing corresponding to a second embodiment.

Next, a second embodiment of the present invention will be described below. Referring to FIG. 6, there is shown a flowchart of assistance in explaining a procedure for record processing corresponding to the second embodiment. At this point, the processing in the second embodiment is performed on condition that an absence of the boundary portion 33 in all information recording layers is confirmed on the basis of recording position information previous to recording onto a multilayer optical disk. If the boundary portion 33 exists in a specific information recording layer, the above first embodiment is executed, for example.

In FIG. 6, the focused layer is set to the deepest layer (the deepest layer viewed from an angle of the laser beam emitting source) on the above condition (step S11). Then, it is determined whether a free area required for recording exists in the focused layer on the basis of the recording position information (step S12). If the free area in the focused layer is insufficient as a result (step S12: NO), an information recording layer on the information recording layer is set as a focused layer (step S13) and then the control progresses to the step S12 again. When the focused layer reaches the top information recording layer, the processing in FIG. 6 is terminated.

Subsequently, recording information is started in the given free area in the information recording layer corresponding to the focused layer (step S14). Then, after required information is recorded, the record processing is terminated (step S15). In this condition, while generally recording is advanced sequentially from the inner circumferential side to the outer circumferential side, it is possible to advance it sequentially from the outer circumferential side to the inner circumferential side. Otherwise, it is possible to record information in random positions in an information recording layer.

As set forth hereinabove, according to the second embodiment, information is recorded onto all areas in the deepest layer initially and then the operation progresses to the upper layer when no unrecorded area 32 remains in recording onto the multilayer optical disk. After that, the operation progresses to the upper layer sequentially on condition that information is recorded onto all areas in each information recording layer in the same manner. In other words, the recording is performed under the condition that recording is completed in all underlying layers of the information recording layer, which is an object of recording, without laser beam reflected nor transmitted on the boundary portion 33 while no information is recorded in overlying layers. Therefore, there is no need for identifying the boundary portion 33 whenever information is recorded, thereby resolving the problem in the tracking servo caused by the laser beam transmitted or reflected on areas in the vicinity of the boundary portion 33.

While the operation is advanced from the deepest layer to the upper layer sequentially in the recording order preset for the information recording layers in the second embodiment, it is possible to advance it from the top layer to the lower layer sequentially in contrast or to set a given recording order to each information recording layer.

As set forth hereinabove, according to the present invention, when information is recorded in a multilayer optical information recording medium, information is recorded in such a procedure that recording is inhibited in positions where it is affected by a boundary portion between a recorded area and an unrecorded area, thereby realizing an information recording apparatus capable of detecting an accurate tracking error without affecting a tracking servo in an information recording layer to be an object of recording even if a reflectance or a transmittance varies in each information recording layer.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 2001-33963 filed on Feb. 9, 2001 including the specification, claims, drawings and summary is incorporated herein by reference in its entirety.

What is claimed is:

1. An information recording apparatus for optically recording information onto an information recording medium having a plurality of information recording layers, comprising:

a detecting device which detects a position of a boundary portion between a recorded area and an unrecorded area in the information recording layer, the recorded area being area where the information has already been recorded, and the unrecorded area being area where no information has been recorded;

a determining device which determines whether or not a tracking servo for recording the information onto an area in one information recording layer is affected by the boundary portion in the other information recording layer; and an inhibiting device which inhibits recording the information onto the area in the one information recording layer, in a case where the determining device determines that the tracking servo for recording the information onto the area in the one information recording layer is affected.

2. The information recording apparatus according to claim 1, wherein the determining device determines the effect of the boundary portion on the tracking servo, on the basis of at least any one of a track number of recorded tracks and one of unrecorded tracks of the other information recording layers within a range of a diameter of a luminous flux in the boundary portion in the other information recording layer irradiated with a light beam for recording.

3. The information recording apparatus according to claim 1, further comprising a controlling device which controls a recording order for the respective information recording layers, wherein when the determining device determines that the tracking servo for recording the information onto the area in the one information recording layer is not affected, the controlling device controls the recording order so as to start recording onto the other information recording layer when recording onto a whole area of one information recording layer is completed.

4. The information recording apparatus according to claim 1, wherein the controlling device controls the recording order so as to record information onto an adjacent information recording layer one by one toward a light beam emitting source from the information recording layer farthest from the light beam emitting source.

5. The information recording apparatus according to claim 1, wherein the controlling device controls the recording order so as to record information onto an adjacent information recording layer one by one farther from a light beam emitting source from the information recording layer nearest the light beam emitting source.

6. The information recording apparatus according to claim 2, wherein the determining device determines the effect of the boundary portion on the tracking servo, on the basis of whether or not a ratio of a track number of tracks of the other information recording layers included within the range of the diameter of the luminous flux is equal or less than a predetermined threshold.

7. The information recording apparatus according to claim 6, wherein the threshold is set according to any one of the diameter of the luminous flux and a difference of a reflectance or a transmittance between the recorded area and the unrecorded area.

* * * * *